(12) United States Patent
Raven et al.

(10) Patent No.: US 10,578,823 B2
(45) Date of Patent: Mar. 3, 2020

(54) WALL CABINETS AND FIBER MANAGEMENT TRAYS

(71) Applicant: AFL IG LLC, Duncan, SC (US)

(72) Inventors: Asher Leong Raven, Milton Keynes (GB); Jeffrey Ye, Luohu Dist (CN); Aran James Russell Davidson, Chesham (GB)

(73) Assignee: AFL IG LLC, Duncan, SC (US)

( * ) Notice: Subject to any disclaimer, the term of this patent is extended or adjusted under 35 U.S.C. 154(b) by 0 days.

(21) Appl. No.: 16/001,532

(22) Filed: Jun. 6, 2018

(65) Prior Publication Data

US 2019/0204521 A1 Jul. 4, 2019

Related U.S. Application Data

(60) Provisional application No. 62/611,320, filed on Dec. 28, 2017.

(51) Int. Cl.
*G02B 6/44* (2006.01)

(52) U.S. Cl.
CPC .......... *G02B 6/4455* (2013.01); *G02B 6/4452* (2013.01); *G02B 6/4454* (2013.01)

(58) Field of Classification Search
None
See application file for complete search history.

(56) References Cited

U.S. PATENT DOCUMENTS

| | | |
|---|---|---|
| 5,247,603 A | 9/1993 | Vidacovich et al. |
| 5,323,480 A * | 6/1994 | Mullaney ............. G02B 6/4442 385/134 |
| 5,479,553 A | 12/1995 | Daems et al. |
| 5,535,298 A | 7/1996 | Fasnacht et al. |
| 5,546,495 A | 8/1996 | Bruckner et al. |
| 5,619,608 A | 4/1997 | Foss et al. |
| 5,706,384 A | 1/1998 | Peacock et al. |

(Continued)

FOREIGN PATENT DOCUMENTS

| | | |
|---|---|---|
| DE | 4221475 C2 | 12/1999 |
| EP | 0997758 A2 | 5/2000 |

(Continued)

OTHER PUBLICATIONS

AFL Telecommunications LLC; International Patent Application No. PCT/US2018/066415; International Search Report; dated Jun. 5, 2019; (2 pages).

*Primary Examiner* — Rhonda S Peace
(74) *Attorney, Agent, or Firm* — Dority & Manning, P.A.

(57) ABSTRACT

Wall cabinets and fiber management trays are provided. A cabinet includes a mounting panel, the mounting panel including a rear panel and a mounting bracket extending from the rear panel along a transverse axis. The cabinet further includes a backboard mountable to the mounting panel such that a gap is defined between the backboard and the rear panel along the transverse axis. The backboard includes a main body defining a first cable manifold and a second cable manifold each extending along a longitudinal axis and a splice section positioned between the first cable manifold and the second cable manifold along a lateral axis. The cabinet further includes a plurality of splice trays disposed in the splice section.

20 Claims, 10 Drawing Sheets

(56) References Cited

U.S. PATENT DOCUMENTS

| | | |
|---|---|---|
| 5,887,106 A * | 3/1999 | Cheeseman .......... G02B 6/4454 |
| | | 385/135 |
| 6,061,492 A | 5/2000 | Strause et al. |
| 6,226,436 B1 * | 5/2001 | Daoud ................ G02B 6/4442 |
| | | 385/134 |
| 6,249,632 B1 | 6/2001 | Wittmeier, II et al. |
| 6,356,697 B1 | 3/2002 | Braga et al. |
| 6,424,781 B1 | 7/2002 | Puetz et al. |
| 6,504,987 B1 | 1/2003 | Macken et al. |
| 6,507,691 B1 | 1/2003 | Hunsinge et al. |
| 6,744,962 B2 | 6/2004 | Allerellie |
| 7,295,747 B2 | 11/2007 | Solheid et al. |
| 7,302,151 B2 | 11/2007 | Lapp |
| 7,330,626 B2 | 2/2008 | Kowalczyk et al. |
| 7,418,183 B2 | 8/2008 | Wittmeier et al. |
| 7,471,867 B2 | 12/2008 | Vogel et al. |
| 7,657,148 B2 | 2/2010 | Kowalczyk et al. |
| 7,715,682 B2 | 5/2010 | Beck |
| 8,189,983 B2 * | 5/2012 | Brunet ................. G02B 6/4452 |
| | | 385/135 |
| 8,213,760 B2 | 7/2012 | Rudenick et al. |
| 8,374,477 B2 | 2/2013 | Hill |
| 8,837,894 B2 | 9/2014 | Holmberg et al. |
| 8,929,708 B2 | 1/2015 | Pimentel et al. |
| 9,304,276 B2 | 4/2016 | Solheid et al. |
| 9,494,759 B2 * | 11/2016 | Claessens ............ G02B 6/4453 |
| 9,791,653 B2 | 10/2017 | Aznag et al. |
| 9,857,547 B2 * | 1/2018 | Claessens ............ G02B 6/4455 |
| 2006/0029351 A1 * | 2/2006 | Lapp .................... G02B 6/4445 |
| | | 385/135 |
| 2009/0097813 A1 | 4/2009 | Hill |
| 2011/0026894 A1 | 2/2011 | Rudenick et al. |
| 2015/0205064 A1 | 7/2015 | Claessens |
| 2015/0355428 A1 | 12/2015 | Leeman et al. |
| 2017/0052338 A1 | 2/2017 | Claessens |
| 2017/0235067 A1 | 8/2017 | Holmberg et al. |
| 2017/0269324 A1 | 9/2017 | Im |
| 2017/0329096 A1 | 11/2017 | Allen |

FOREIGN PATENT DOCUMENTS

| | | |
|---|---|---|
| EP | 1171790 A1 | 1/2002 |
| EP | 1304590 A2 | 4/2003 |
| EP | 2533086 A1 | 12/2012 |
| EP | 2661092 A1 | 11/2013 |
| EP | 2823345 A2 | 1/2015 |
| EP | 2616860 B1 | 3/2015 |
| EP | 2290418 B1 | 6/2015 |
| EP | 2927724 A1 | 10/2015 |
| EP | 3258302 A1 | 12/2017 |
| GB | 2368138 A | 4/2002 |
| WO | WO99/27404 A1 | 6/1999 |

* cited by examiner

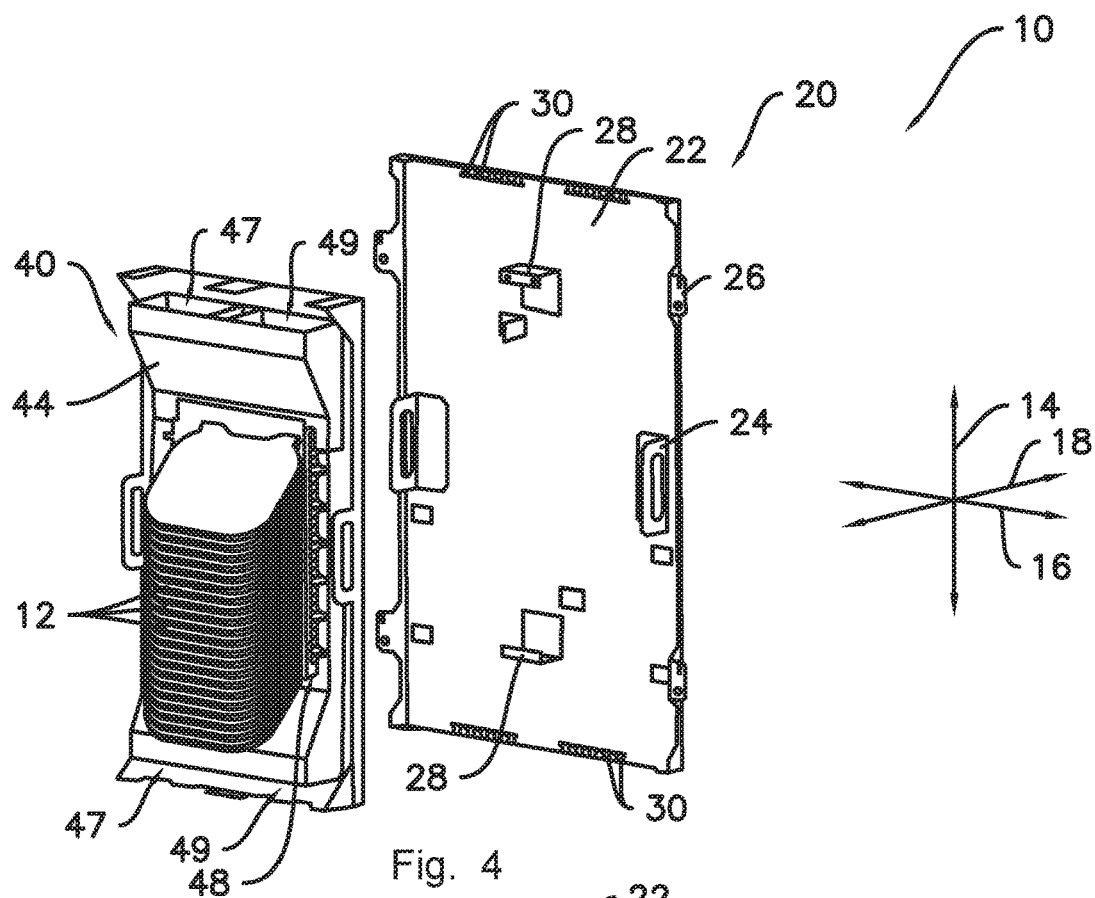
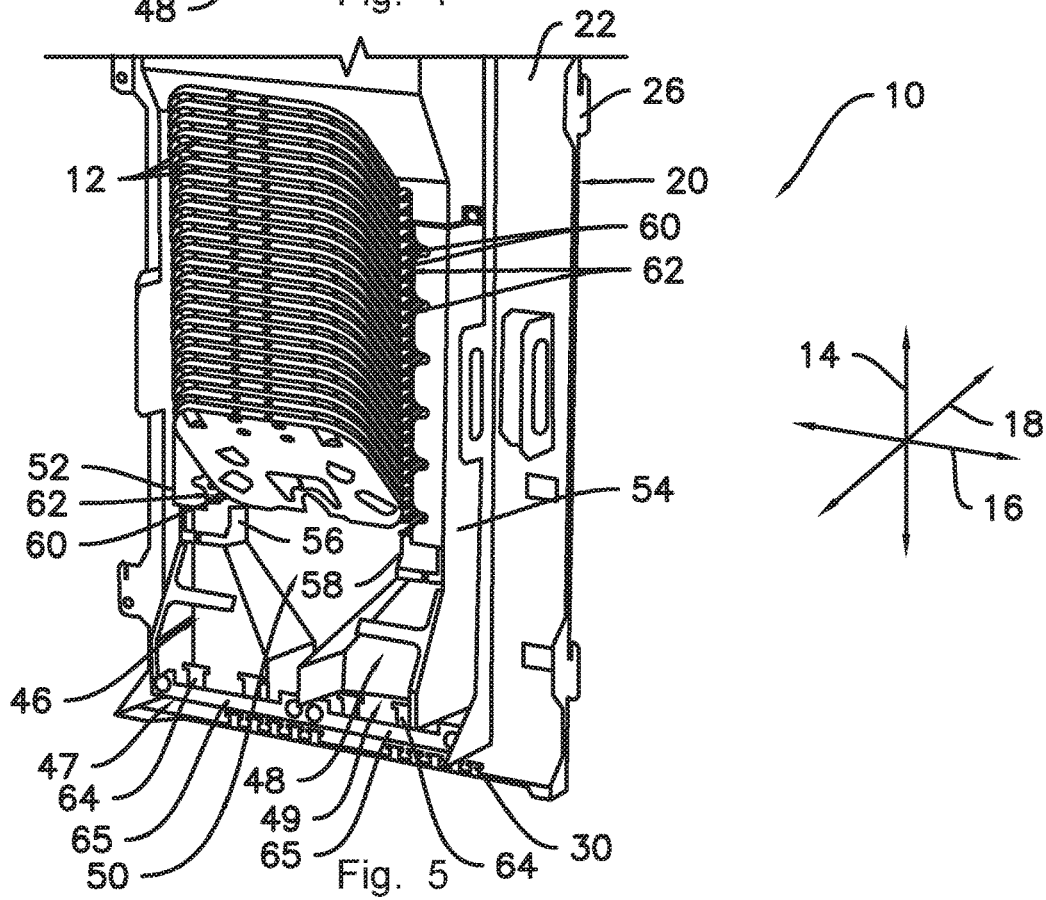
Fig. 4
Fig. 5

WALL CABINETS AND FIBER MANAGEMENT TRAYS

PRIORITY STATEMENT

The present application claims priority to U.S. Provisional Patent Application Ser. No. 62/611,320, filed Dec. 28, 2017, which is incorporated by reference herein in its entirety.

FIELD

The present disclosure relates generally to wall cabinets and fiber management trays for housing and facilitating splicing of optical fibers.

BACKGROUND

Splicing is utilized in many situations to efficiently couple together optical fibers. In some situations these fibers are ribbonized into groups of fibers and mass spliced. In general, the term "mass splice" refers to the use of a splicing machine to splice together multiple (such as in some cases 12) pairs of optical fibers. Alternatively, single element splicing of non-ribbonized optical fibers may be utilized.

Many known splice trays are designed to accommodate up to 12 mass splices. The splice trays generally house the splices and protect the bend radius of the fibers to minimize attenuation within the fibers, while also providing adequate protection so that the fibers may be installed for significant lengths of time (such as on the order of 25 years) and maintain integrity and reusability. Such splice trays must also accommodate excess fiber so that if there is a problem when splicing there is slack available to have multiple attempts at splicing. One typical overlength storage requirement is 1.5 meters of fiber per cable.

The use of traditional optical fiber ribbons in known splice trays can cause issues. For example, due to the preferential bend of traditional optical fiber ribbons, coiling of such ribbons is very difficult. Traditional "figure 8" style routes in known splice trays can thus cause twisting and attenuation of such ribbon.

Accordingly, splice trays which can provide improved routing for traditional optical fiber ribbons would be advantageous. Further, splice trays which can accommodate and provide routing for both traditional and non-traditional optical fiber ribbons, such as intermittently bonded optical fiber ribbons, while also allowing splicing of non-ribbonized optical fibers, would be advantageous.

Additionally, in many cases, a significant number of splice trays are provided at the same location, such as in a cabinet, to enable the splicing together of a significant number of optical fibers from one or more fiber optic cables. In the datacenters and other environments in which such cabinets are provided, space is at a premium and the number of splice connections that are necessary is constantly increasing. Additionally, in some situations, multiple cabinets may be required to accommodate the access of multiple 'service providers' to customers at a certain location, i.e. in a building. Accordingly, improved cabinets which include features for improved routing and organization of cables to be spliced as well as improved space usage would be advantageous.

BRIEF DESCRIPTION

Aspects and advantages of the invention will be set forth in part in the following description, or may be obvious from the description, or may be learned through practice of the invention.

In accordance with one embodiment, a fiber management tray is provided. The tray includes a tray body defining an interior, the tray body including a base panel and a plurality of side panels. The plurality of side panels include a first sidewall and opposing second sidewall spaced apart from each other along a lateral axis and a front wall and opposing rear wall spaced apart from each other along a transverse axis. The interior may be partitioned into a front splice portion at the front wall, a first rear storage portion at the first sidewall, and a second rear storage rear portion at the second sidewall. The tray may further include at least one first wing extending into the first rear storage portion, and at least one second wing extending into the second rear storage portion. The tray may further include a first entry and a second entry each defined through the tray body at the rear wall. The tray may further include a crossover opening defined between the first rear storage portion and the second rear storage portion. The tray may further include a splice holder disposed within the front splice portion.

In accordance with another embodiment, a wall cabinet is provided. The cabinet includes a mounting panel, the mounting panel including a rear panel and a mounting bracket extending from the rear panel along a transverse axis. The cabinet further includes a backboard mountable to the mounting panel such that a gap is defined between the backboard and the rear panel along the transverse axis. The backboard includes a main body defining a first cable manifold and a second cable manifold each extending along a longitudinal axis and a splice section positioned between the first cable manifold and the second cable manifold along a lateral axis. The cabinet further includes a plurality of splice trays disposed in the splice section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which:

FIG. 4 is a perspective exploded view of components of a wall cabinet in accordance with embodiments of the present disclosure;

FIG. 5 is a close-up perspective view of components of a wall cabinet, with panels removed for illustrative purposes, in accordance with embodiments of the present disclosure;

DETAILED DESCRIPTION

Figure 1:
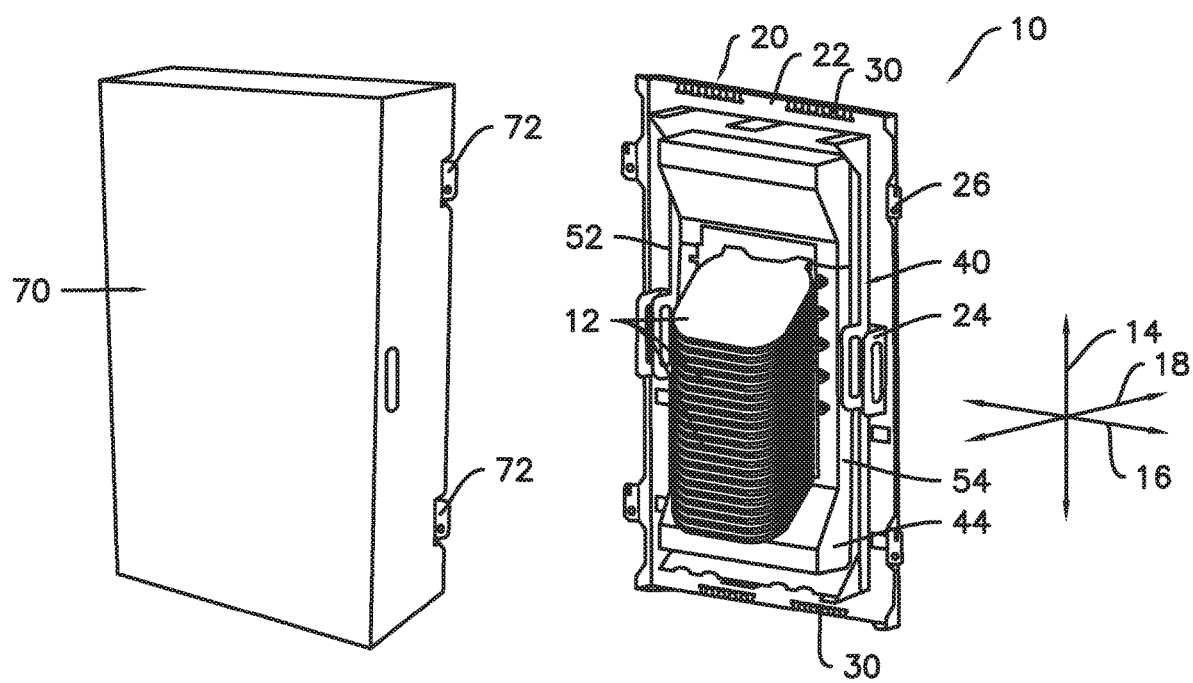
FIG. 1 is a perspective exploded view of a wall cabinet in accordance with embodiments of the present disclosure.
Figure 2:
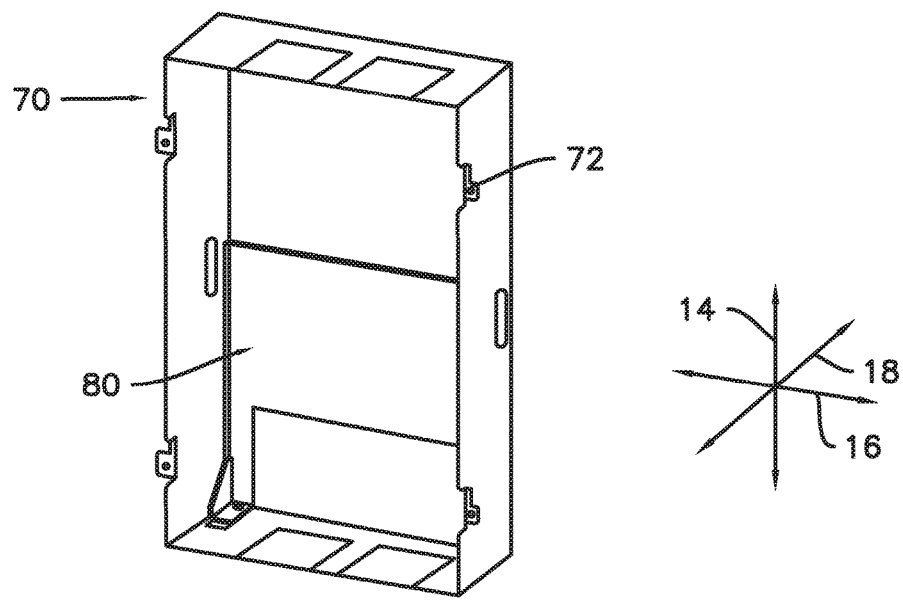
FIG. 2 is a rear perspective view of a cover of a wall cabinet, along with a tray in a stored position, in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 8, embodiments of wall cabinets 10 in accordance with the present disclosure are provided. Such wall cabinets advantageously house a plurality of splice trays 12 therein. As discussed herein, cabinets 10 in accordance with the present disclosure advantageously provide improved and efficient cable and optical fiber routing and organization, and further facilitate improved space usage in the environments in which the cabinets are provided.

As shown, an orthogonal coordinate system including mutually orthogonal longitudinal axis 14, lateral axis 16, and transverse axis 18 are provided for cabinets 10 as discussed herein.

A cabinet 10 according to the present disclosure includes a mounting panel 20 which is mountable to a wall or other feature in an environment in which the cabinet 10 is provided. The mounting panel 20 may include a rear panel 22 which may contact the wall or other feature. Rear panel 22 may, for example, extend along and in a plane defined by the longitudinal axis 14 and lateral axis 16 as shown. Handles 24 may extend from the rear panel 22, such as along the transverse axis 18. Outer brackets 26 may be provided at edges of the rear panel 22 for mounting of a cover to the mounting panel 20.

One or more mounting brackets 28 may extend from the rear panel 22, such as along the transverse axis 18. The mounting brackets 28 may be provided for mounting of a backboard 40 onto the mounting panel 20. In exemplary embodiments, a plurality of mounting brackets 28 may be provided. Further, in exemplary embodiments, the mounting brackets 28 may be spaced apart from each other along the longitudinal axis 14.

One or more tie tabs 30 may extend from the rear panel 22, such as from outer edges thereof as shown. Each tie tab 30 may be a tie-off location for a fiber optic cable, as discussed herein. For example, in some embodiments, a tie-off clamp or other suitable component may connect a fiber optic cable to such tie tab 30. In exemplary embodiments, a plurality of tie tabs 30 may be provided. Further, in some embodiments, the tie tabs 30 may be arranged in groups, with the groups spaced apart from each other along the longitudinal axis 14.

Figure 7:
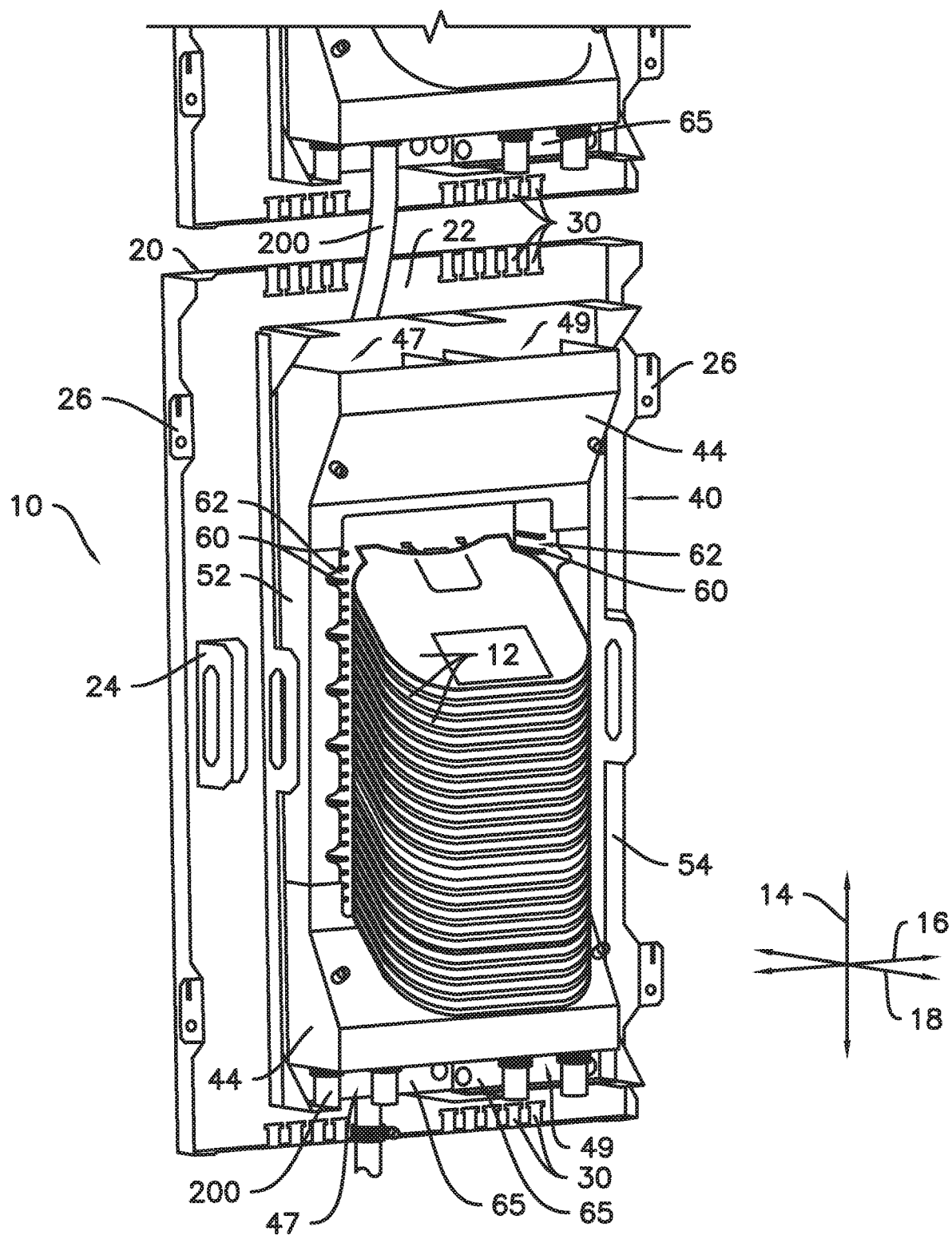
FIG. 7 is a perspective view of multiple wall cabinets in accordance with embodiments of the present disclosure.
Figure 8:
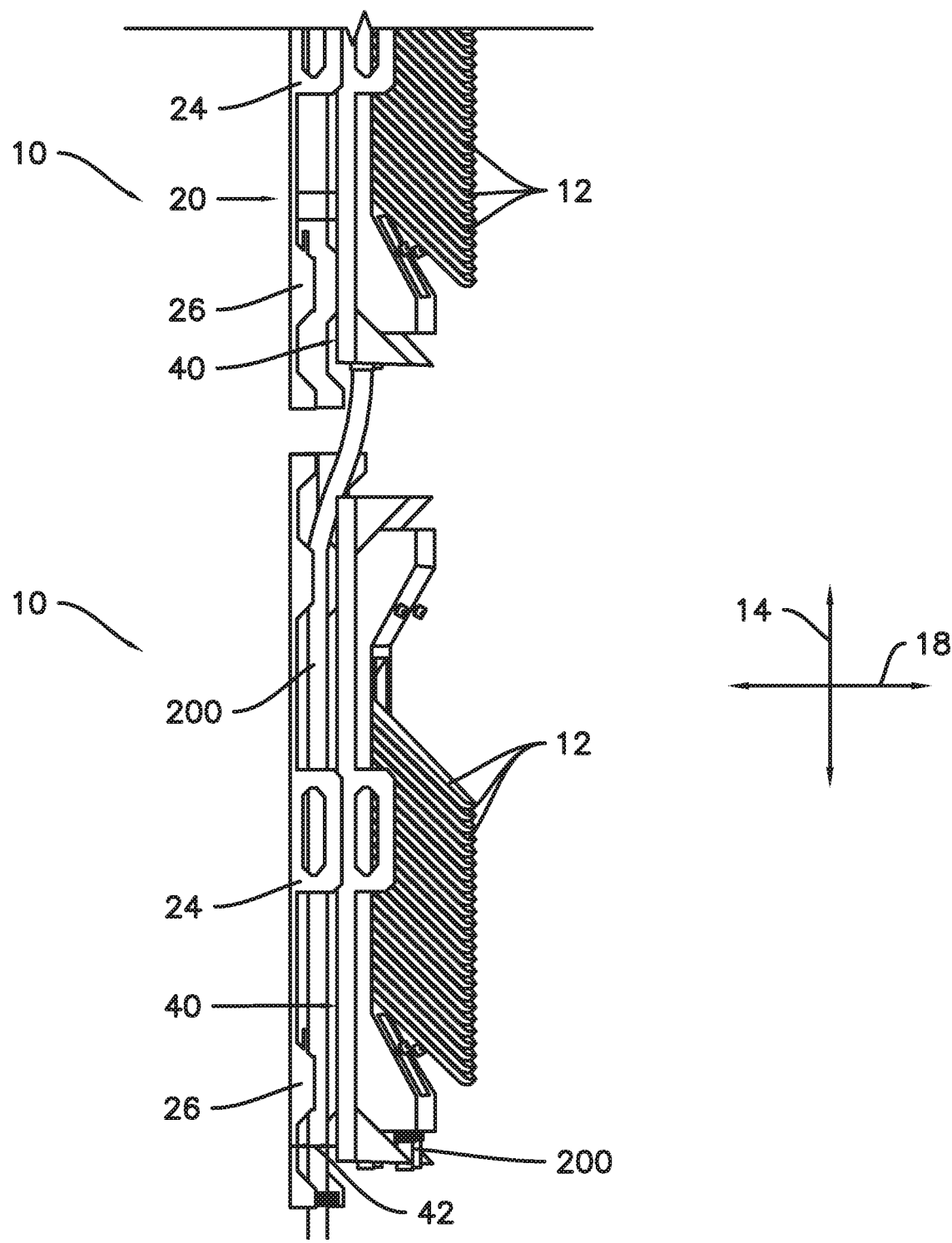
FIG. 8 is a side view of multiple wall cabinets in accordance with embodiments of the present disclosure.

As shown, a wall cabinet 10 includes a backboard 40. The backboard 40 is mountable to the mounting panel 20. For example, the mounting brackets 28 may support the backboard 40 when mounted to the mounting panel 20. As shown in FIGS. 7 and 8, in exemplary embodiments, a gap 42 may be defined between the backboard 40 (such as a rear surface thereof along the transverse axis 18) and the rear panel 22 along the transverse axis 18 when the backboard 40 is mounted to the mounting panel 20. In exemplary embodiments, no portion of the backboard 40 may thus contact the rear panel 22. The gap 42 may, for example, be greater than 0.5 inches, such as between 0.5 inches and 3 inches, such as between 1 inch and 2 inches.

The positioning of the backboard 40 relative to the mounting panel 20 such that gap 42 is defined advantageously provides improved space usage for cabinets 10 in accordance with the present disclosure. For example, such positioning facilitates the positioning of multiple cabinets 10 in a stacked arrangement along the longitudinal axis 14. Fiber optic cables 200 which are being spliced in a particular cabinet 10 may be routed in the gap 42 of other cabinets 10, i.e. cabinets above or below such particular cabinet 10 along the longitudinal axis 14. Accordingly, multiple rows of cabinets 10 can be provided in a relatively small space, advantageously allowing for a significant increase in the number of splices that can be made and stored in such space.

Notably, when routing of a cable 200 in the gap 42 of a cabinet 10, the cable 200 may be connected to the cabinet 10 at one or more tie tabs 30 of the mounting panel 20, as shown.

Referring again to FIGS. 1 through 8, backboard 40 includes a main body 44 which defines various spaces for optical fiber routing, management and splicing. For example, the main body 44 may define a first cable manifold 46 and a second cable manifold 48, each of which extends along the longitudinal axis 14. Each of the first cable manifold 46 and second cable manifold 48 may accommodate therein incoming and/or outgoing cables 200 to be spliced. In some embodiments, for example, incoming cables 200 may be routed through the first cable manifold 46, while outgoing cables 200 may be routed through the second cable manifold 48.

In exemplary embodiments, the first and second cable manifolds 46, 48 may each taper along a portion of a length thereof. For example, each of the first and second cable manifolds 46, 48 may include one or more inlets 47, 49. In some embodiments, the manifolds 46, 48 may taper from the inlets 47, 49 along a portion of the lengths thereof. The inlets 47, 49 may, for example, be the vertically lowest and/or highest portions of the manifolds 46, 48 along the longitudinal axis 14.

The main body 44 may further define a splice section 50. The splice section 50 may house the splice trays 12. Splice section 50 may, for example, be positioned between the first cable manifold 46 and the second cable manifold 48 along the lateral axis 16. Cables 200 being routed into the manifolds 46, 48 may be stripped of their outer jackets, etc., and optical fibers from the cables 200 may be routed from the manifolds 46, 48 into the splice section 50 for splicing thereof.

A plurality of sidewalls may define and divide the manifolds 46, 48, and splice section 50. For example, main body 44 may include a first outer sidewall 52 and a second outer sidewall 54. The main body 44 may further include a first inner sidewall 56 and a second inner sidewall 58. The first outer sidewall 52 and first inner sidewall 56 may be spaced apart from each other along the lateral axis 16 to define the first cable manifold 46 therebetween. The second outer sidewall 54 and second inner sidewall 58 may be spaced apart from each other along the lateral axis 16 to define the second cable manifold 46 therebetween. The first inner sidewall 56 and second inner sidewall 58 may be spaced apart from each other along the lateral axis 16 to define the splice section 50 therebetween.

To facilitate access from the manifolds 46, 48 to the splice section 50, gaps 62 may be defined in the inner sidewalls 56, 58. The splice section 50 may be accessible from the manifolds 46, 48 through such gaps 62. Accordingly, optical fibers from the cables 200 in the manifolds 46, 48 may be routed from the manifolds 46, 48 through the gaps 62 into the splice section 50. In some embodiments, the first and second inner sidewalls 56, 58 may each include a plurality of fingers 60. The gaps 62 may be defined between adjacent fingers 60.

Backboard 40 may include one or more tie tabs 64. The tie tabs 64 may, for example, be located at an inlet 47, 49 of the manifolds 46, 48. In some embodiments, a plurality of tie tabs 64 may be located at an inlet 47, 49 of the manifolds 46, 48. Each tie tab 64 may be a tie-off location for a fiber optic cable 200 that is entering the associated manifold 46, 48. For example, in some embodiments, a tie-off clamp or other suitable component may connect a fiber optic cable to such tie tab 64.

In some exemplary embodiments, the tie tabs 64 may be a part of removable tie mounts 65 which can be removable connected to the backboard 40. The use of such mounts 65 advantageously allows for mounts 65 with different numbers of tie tabs 64 to be utilized as needed. Alternatively, however, the tie tabs 64 may extend from (and not be removable from) another component of the backboard 40 such as the main body 44.

As discussed, a plurality of splice trays 12 may be disposed in the splice section 50. Each splice tray 12 may be connected to the backboard 40, such as to the main body 44 thereof. The splice trays 12 may, as shown, be stacked in a vertical array along the longitudinal axis 14. In exemplary embodiments, each splice tray 12 may be rotatable relative to the backboard 40 about an axis 13 that is perpendicular to the lateral axis 16.

In use, optical fibers from cables 200 in the manifolds 46, 48 may, after entering the splice section 50, be routed into a splice tray 12. The optical fibers may be spliced together within such splice tray 12. In exemplary embodiments, optical fibers from a cable 200 in the first cable manifold 46 may be spliced together with optical fibers from a cable 200 in the second cable manifold 48.

Figure 9:
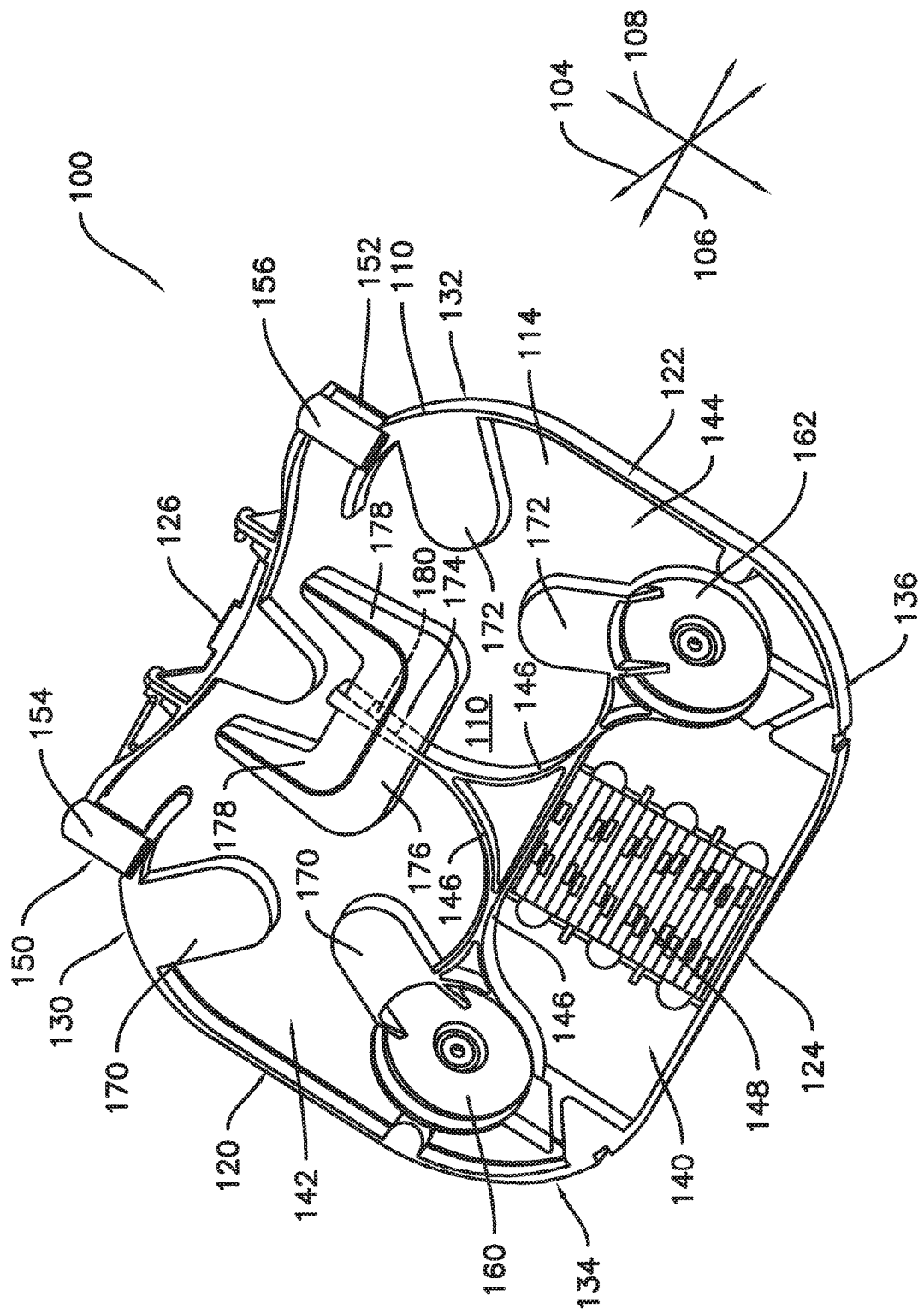
FIG. 9 is a perspective view of a fiber management tray in accordance with embodiments of the present disclosure.
Figure 10:
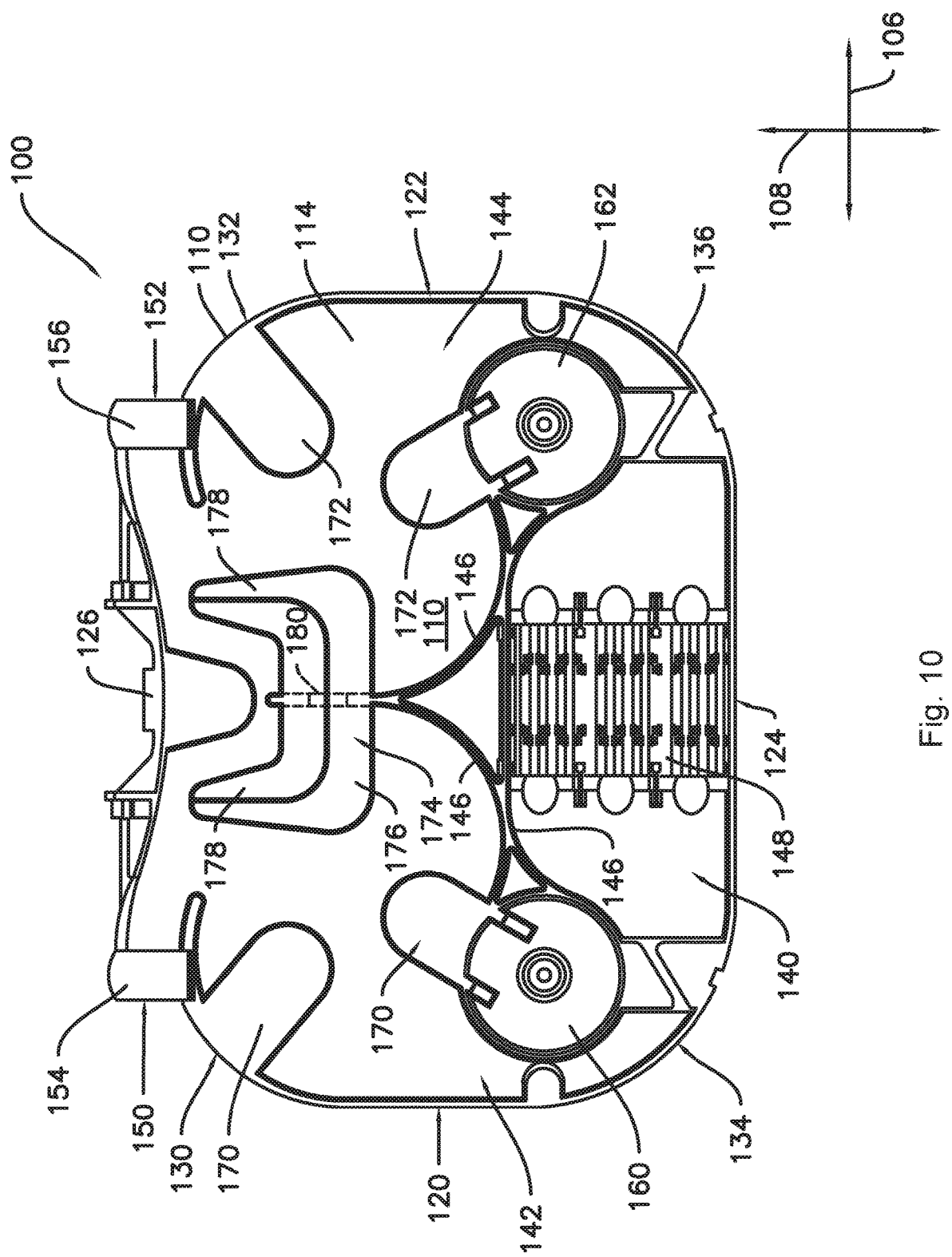
FIG. 10 is a top view of a fiber management tray in accordance with embodiments of the present disclosure.
Figure 11:
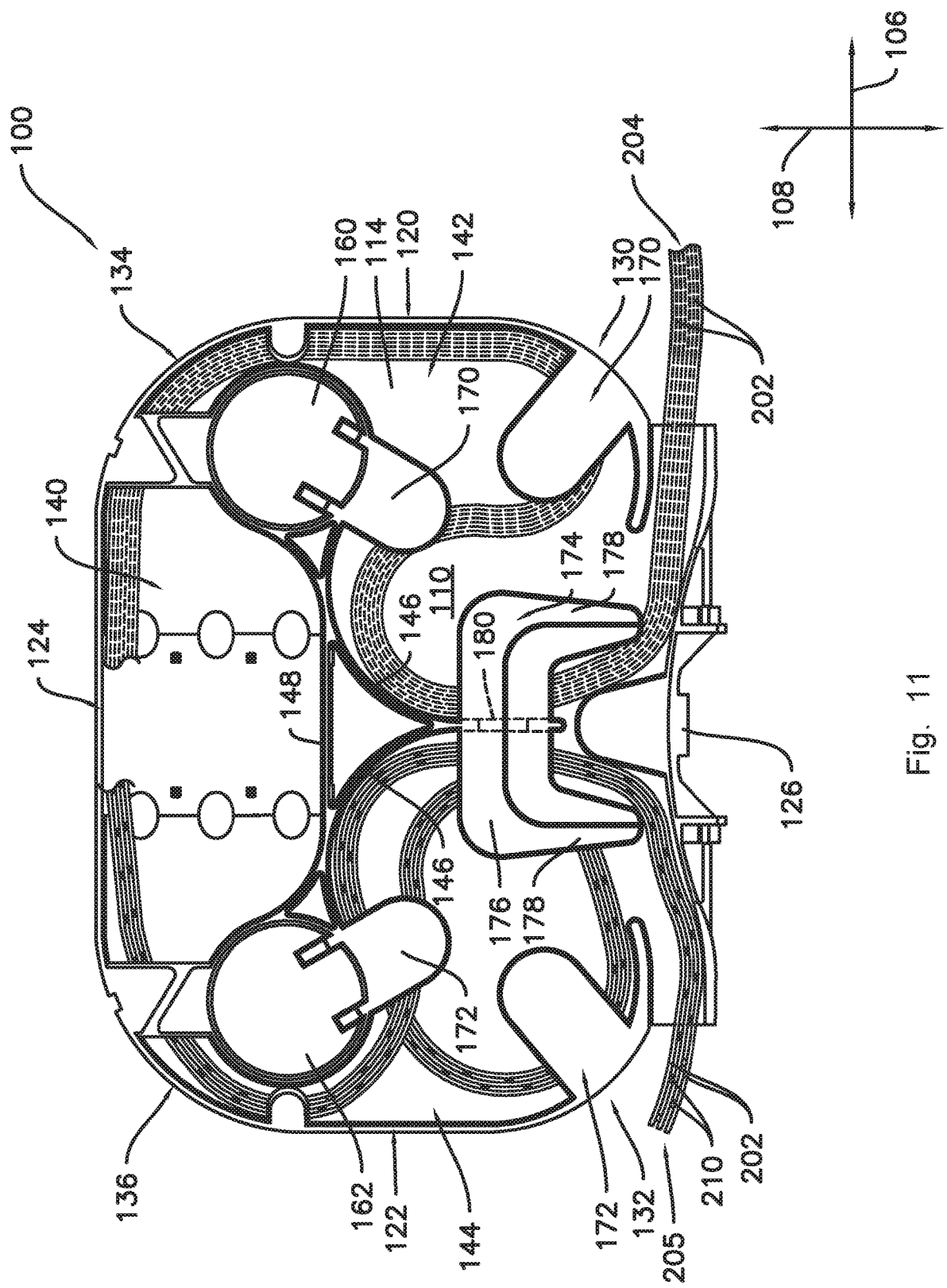
FIG. 11 is a top view of a fiber management tray, with optical fiber ribbons illustrating routing paths therein, in accordance with embodiments of the present disclosure.

In exemplary embodiments, one or more of the splice trays 12 (such as the plurality of splice trays 12) may be fiber management trays 100 as discussed herein and as shown in FIGS. 9 through 11. Alternatively, other suitable splice trays 12 may be utilized.

A cabinet 10 in accordance with the present disclosure may include a cover 70. Cover 70 may be removably mountable to the mounting panel 20. Backboard 40 may be enclosable between the cover 70 and mounting panel 20, such that the cables 200 and splice trays 12 are protected by the cover 70 and mounting panel 20 when mounted together.

The cover 70 may, for example, include outer brackets 72 provided at edges thereof for connecting with outer brackets 26 to mount the cover 70 to the mounting panel 20.

Figure 3:
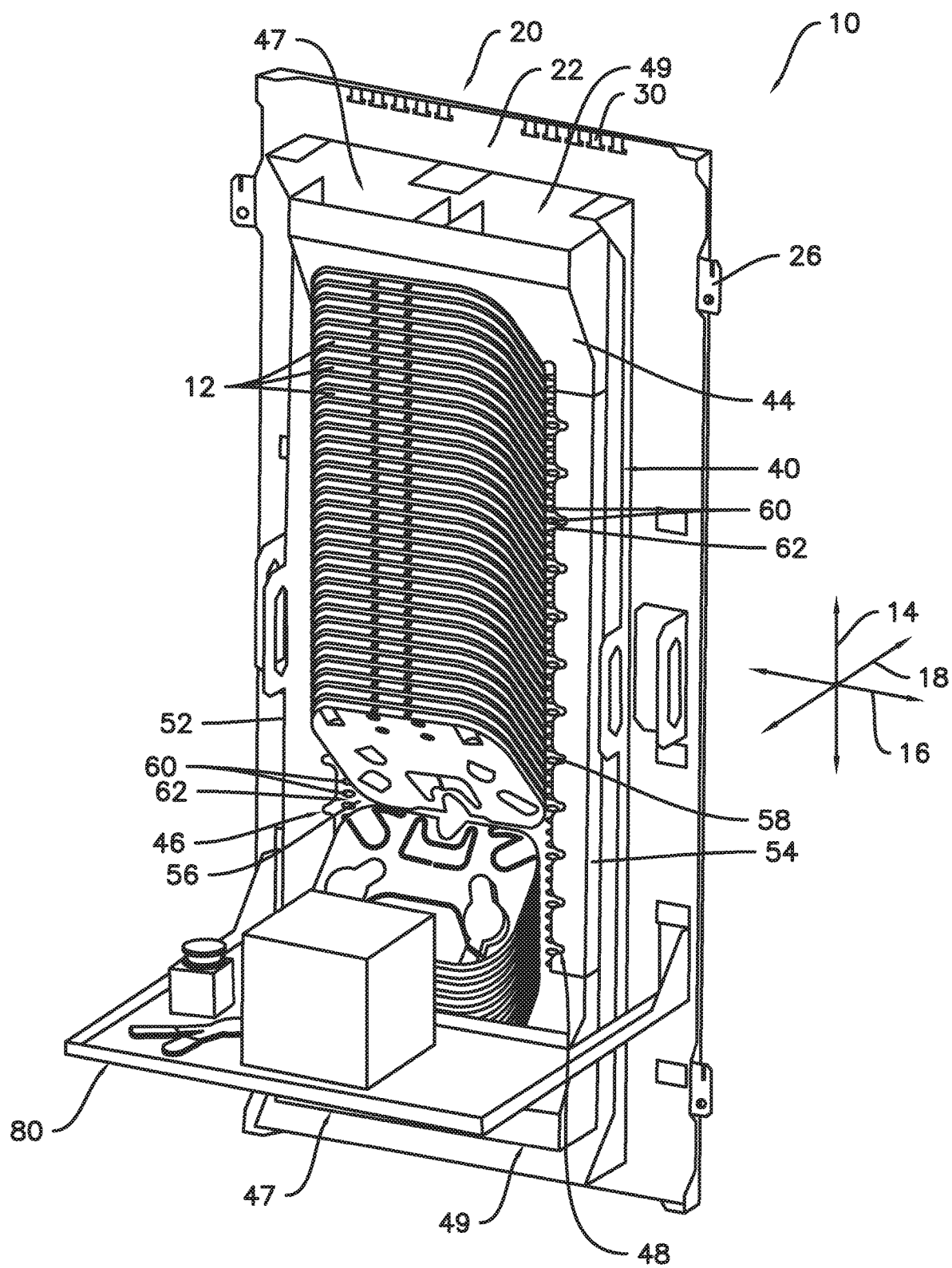
FIG. 3 is a perspective view of components of a wall cabinet, including a tray in a mounted position, in accordance with embodiments of the present disclosure.
Figure 6:
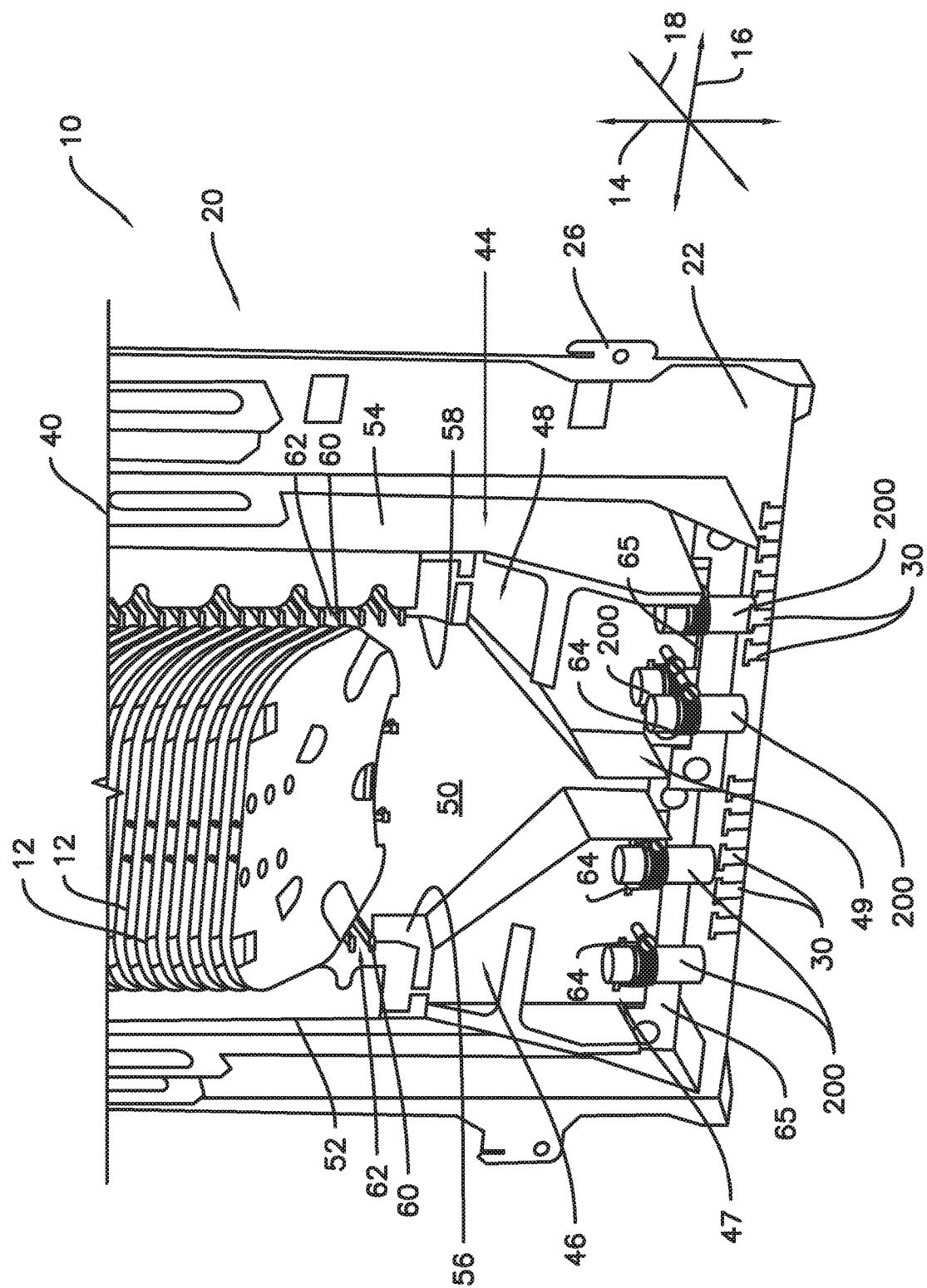
FIG. 6 is a close-up perspective view of components of a wall cabinet in accordance with embodiments of the present disclosure.

A cabinet 10 in accordance with the present disclosure may further include a tray 80. The tray 80 may be storable within the cover 70, as shown for example, in FIG. 2. Further, the tray 80 may be removably mountable to the mounting panel 20, such as to the rear panel 22 thereof, as shown in FIG. 3. The tray 80 thus advantageously provides a work station for a user during splicing operations, and can conveniently be stored when such splicing operations are competed.

In exemplary embodiments, the mounting panel 20 and/or backboard 40 may be symmetrical, such as about the longitudinal axis 14 and/or about the lateral axis 16. Such symmetry may advantageously provide both manufacturing and assembly efficiencies.

Figure 12:
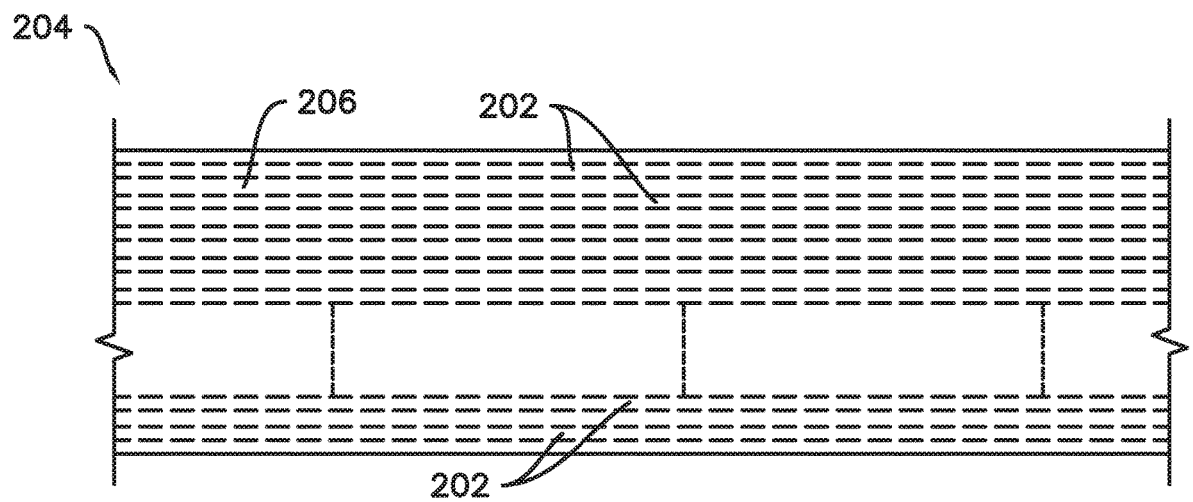
FIG. 12 is a top view of an optical fiber ribbon in accordance with some embodiments of the present disclosure.
Figure 13:
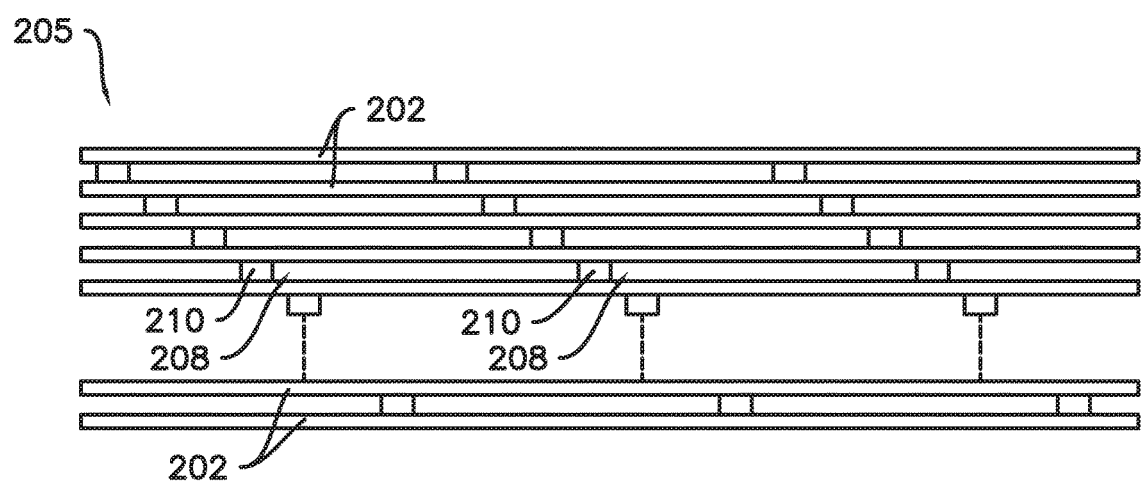
FIG. 13 is a top view of an optical fiber ribbon in accordance with other embodiments of the present disclosure.

Referring now briefly to FIGS. 12 and 13, cables 200 in accordance with the present disclosure may include a plurality of optical fibers. Any suitable optical fibers 202 may be utilized in such cables 200. For example, the optical fibers 202 may be single mode optical fibers or multi-mode optical fibers. Further, in some embodiments, the optical fibers 202 may have nominal (plus or minus 3 microns) outer diameters of 250 microns. In alternative embodiments, the optical fibers 202 may have nominal outer diameters of 200 microns. In other embodiments, other suitable nominal outer diameters may be utilized.

In some embodiments, the optical fibers are loose optical fibers. Alternatively, however, one or more optical fiber ribbons is provided. In some embodiments, as shown in FIG. 12, an optical fiber ribbon may be a traditional ribbon 204, with a plurality of optical fibers 202 encased in an outermost jacket or layer 206 which entirely surrounds the optical fibers 202 and bonds the optical fibers 202 together along the lengths thereof. In alternative embodiments, as shown in FIG. 13, the optical fibers 202 may be intermittently bonded to each other (via, for example, portions of the outermost jacket or layer of the optical fibers 202 or another suitable bonding material), thus forming one or more intermittently bonded ribbons 205. Such intermittent bonding may occur along the lengths of the optical fibers 202, thus leaving non-bonded gaps 208 between neighboring optical fibers 202 as shown. Further, bonded portions 210 of neighboring optical fibers 202 may be staggered along the lengths of the optical fibers 202 such that neighboring optical fibers 202 in a ribbon are bonded to each other at different locations along their lengths and the length of the ribbon 205.

Referring now to FIGS. 9 through 11, fiber management trays 100 in accordance with the present disclosure are provided. In exemplary embodiments, such trays 100 can be utilized as trays 12 in cabinets 10. Alternatively, however, such trays 100 can be utilized in any other suitable mass and/or single splice environments.

As shown, an orthogonal coordinate system including mutually orthogonal longitudinal axis 104, lateral axis 106, and transverse axis 108 are provided for trays 100 as discussed herein. In some embodiments, such axes may correspond to the axes of a cabinet 10 as discussed herein.

A tray 100 in accordance with the present disclosure includes a tray body 110 which defines an interior 112. The tray body 110 includes a base panel 114 which extends along and in a plane defined by the lateral axis 106 and transverse axis 108 as shown. Further, a plurality of side panels may extend from the base panel 114, such as along the longitudinal axis 104. The interior 112 may be defined by and between the side panels.

The side panels may include a first sidewall 120 and an opposing second sidewall 122 which may be spaced apart from each other along the lateral axis 106. Further, the side panels may include a front wall 124 and an opposing rear wall 126 which may be spaced apart from each other along the transverse axis 108. The walls 120, 122, 124, 126 may extend linearly or curvilinearly. For example, in some embodiments as shown, the sidewalls 120, 122 and front wall 124 may be linear, while the rear wall 126 is curvilinear. The rear wall 126 may, in some embodiments as shown, have a concave central portion and outer convex portions.

The walls 120, 122, 124, 126 may directly connect with each other to form sharp (non-radiused) corners therebetween, or radiused corners may be provided. For example, as shown, the plurality of side panels may include a radiused corner 130 between the first sidewall 120 and rear wall 126, a radiused corner 132 between the second sidewall 122 and rear wall 126, a radiused corner 134 between the first sidewall 120 and front wall 124, and a radiused corner 136 between the second sidewall 122 and front wall 124.

The interior 112 may be partitioned into various sections for optical fiber storage and/or splicing. For example, interior 112 may include a front splice portion 140, a first rear storage portion 142, and a second rear storage portion 144. Front splice portion 140 may be located at and be defined by the front wall 124. In some embodiments, the front splice portion 140 may be centrally located and symmetrical with respect to the transverse axis 108. First rear storage portion 142 may be located at and be defined by the first sidewall 120, as well as in some embodiments radiused corner 130. Second rear storage portion 144 may be located at and be defined by the second sidewall 122, as well as in some embodiments radiused corner 132. In some embodiments, the storage portions 142, 144 may be symmetrical to each other with respect to the transverse axis 108, and located on opposite sides of the transverse axis 108.

Inner partition walls 146 may separate the front splice portion 140 from the first rear storage portion 142 and second rear storage portion 144, and the first rear storage portion 142 from the second rear storage portion 144.

A splice holder 148 may be disposed within the front splice portion 140. The splice holder 148 may hold the spliced portions of spliced together optical fibers 202.

A first entry 150 and a second entry 152 may be defined through the tray body 110, such as through sidewalls thereof. Optical fibers 202 to be spliced together may enter the tray 100 through the first and second entries 150, 152. In exemplary embodiments, an optical fiber 202 entering through the first entry 150 may be spliced to an optical fiber 202 entering through the second entry 152. Such entries 150, 152 may, for example, be located at the rear wall 126. First entry 150 may, for example, be located between rear wall 126 and radiused corner 130. Second entry 152 may, for example, be located between rear wall 126 and radiused corner 132. In some embodiments, the first and second entries 150, 152 may be symmetrical to each other with respect to the transverse axis 108, and located on opposite sides of the transverse axis 108.

In some embodiments, removable clips 154, 156 may be provided at the first and second entries 150, 152. The clips 154, 156 may be removably connected to the tray body 110 at the first and second entries 150, 152 to secure optical fibers 202 entering the tray 100 and prevent the optical fibers 202 from inadvertent movement or removal from the tray 100 during movement of the tray 100, such as for example, in a rotational manner as discussed herein.

In some embodiments, a first guide member 160 and a second guide member 162 may be provided in the tray 100. Each guide member 160 may be a cylindrical member which guides optical fibers 202 in the interior 112. For example, first guide member 160 may be positioned between the first rear storage portion 142 and the front splice portion 140. Accordingly, optical fibers 202 in the first rear storage portion 142 may be routed from the first rear storage portion 142 around the first guide member 160 and into the front splice portion 140. Second guide member 162 may be positioned between the second rear storage portion 144 and the front splice portion 140. Accordingly, optical fibers 202 in the second rear storage portion 144 may be routed from the second rear storage portion 144 around the second guide member 162 and into the front splice portion 140. In some embodiments, the first and second guide members 160, 162 may be symmetrical to each other with respect to the transverse axis 108, and located on opposite sides of the transverse axis 108.

In some embodiments, one or more first wings 170 may extend into the first rear storage portion 142 and one or more second wings 172 may extend into the second rear storage portion 144. At least one first wing 170 and at least one second wing 172, and in some embodiments a plurality of first wings 170 and a plurality of second wings 172, may be provided. The wings 170, 172 may be spaced from the base panel 114 along the longitudinal axis 104 such that gaps are defined therebetween. Optical fibers 202 may be routed underneath wings 170 and/or 172 and thus between the wings 170, 172 and base panel 114. Wings 170, 172 may thus serve to guide and retain the optical fibers 202 within the interior 112.

In some embodiments, a first wing 170 may extend into the first rear storage portion 142 from a sidewall. For example, a first wing 170 may extend into the first rear storage portion 142 from radiused corner 130, as shown, or from first sidewall 120. Additionally or alternatively, a first wing 170 may extend into the first rear storage portion 142 from the first guide member 160. In some embodiments, a second wing 172 may extend into the second rear storage portion 144 from a sidewall. For example, a second wing 172 may extend into the second rear storage portion 144 from radiused corner 132, as shown, or from second sidewall 122. Additionally or alternatively, a second wing 172 may extend into the second rear storage portion 144 from the second guide member 162.

In some embodiments, a third wing 174 may extend into the first and second rear storage portions 142, 144. The wing 174 may be spaced from the base panel 114 along the longitudinal axis 104 such that gap(s) are defined therebetween. Optical fibers 202 may be routed underneath wing 174 and thus between the wing 174 and base panel 114. Wing 174 may thus serve to guide and retain the optical fibers 202 within the interior 112. The wing 174 may, for example, be positioned on inner partition wall(s) 146 separating the first rear storage portion 142 from the second rear storage portion 144. In some embodiments, the wing 174 may centrally located and symmetrical with respect to the transverse axis 108.

Wing 174 may, in some embodiments, include a laterally extending portion 176 which extends along the lateral axis 116. Further, in some embodiments, wing 174 may include one or more transversely extending portions 178 which extend along the transverse axis 118, such as from the laterally extending portion 174. For example, as shown a transversely extending portion 178 may be provided on the end of the laterally extending portion 176 located in the first rear storage portion 142 and on the end of the laterally extending portion 176 located in the second rear storage portion 144.

In exemplary embodiments, a crossover opening 180 may be defined in the tray 100, such as in the tray body 110. The crossover opening 180 may, for example, be defined between the first rear storage portion 142 and the second rear storage portion 144, such as in and through the inner partition wall(s) 146 separating the first rear storage portion 142 from the second rear storage portion 144. In some exemplary embodiments, the crossover opening 180 may be defined underneath (along the longitudinal axis 114) the third wing 174. The crossover opening 180 may provide a pathway for routing of optical fibers 202 from the first rear storage portion 142 to the second rear storage portion 144 or vice-versa.

As discussed herein, in some embodiments, various of the components of a tray 100 may be symmetrical. Further, in some embodiments, a tray 100 in generally, including all components therein, may be symmetrical about the transverse axis 118.

In some embodiments, such as when in use in a cabinet such as cabinet 10 or other environment, trays 100 in accordance with the present disclosure may be rotatable, such as about an axis 190 that is parallel with the lateral axis.

Trays 100 in accordance with the present disclosure advantageously allow for routing and splicing of traditional ribbons 204, intermittently bonded ribbons 205, and or non-ribbonized optical fiber 202.

For example, FIG. 11 illustrates routing of a traditional ribbon 204 into first rear storage portion 142 through first entry 150. Slack ribbon 204 can be routed in a S-shaped pattern within the first rear storage portion 142, and the ribbon 204 can then be routed from the first rear storage portion 142 around the first guide member 160 to the front splice portion 140. Similar routing of a traditional ribbon 204 may occur through second rear storage portion 144, second entry 152, and second guide member 162 if a ribbon 204 to ribbon 204 splice is being made.

FIG. 11 further illustrates routing of an intermittently bonded ribbon 205 into second rear storage portion 144 through second entry 152. Slack ribbon 205 can be routed in a circular pattern within the second rear storage portion 144, and the ribbon 205 can then be routed from the second rear storage portion 144 around the second guide member 162 to the front splice portion 140. Similar routing of an intermittently bonded ribbon 205 may occur through first rear storage portion 142, first entry 150, and second guide member 162 if a ribbon 205 to ribbon 205 splice is being made.

Further, in some embodiments, a ribbon 204 to ribbon 205 splice can be made through routing of a ribbon 204 through the first or second rear storage portion 142, 144 and routing of a ribbon 205 through the other of the first or second rear storage portion 142, 144.

Additionally, ribbon 204 or 205 can be routed through the crossover opening 180 if such routing is desired. For example, ribbon 204 or 205 entering through first entry 150 may be routed through crossover opening 180 to second rear storage portion 144, either before or after routing within first rear storage portion 142, and then routed within second rear storage portion 144 and/or from second rear storage portion 144 to front splice portion 140. Ribbon 204 or 205 entering through second entry 152 may be routed through crossover opening 180 to first rear storage portion 142, either before or after routing within second rear storage portion 144, and then routed within first rear storage portion 142 and/or from first rear storage portion 142 to front splice portion 140.

Notably, the above-described routing methods can additionally or alternatively be utilized for non-ribbonized optical fibers 202. In particular, the routing discussed above with respect to intermittently bonded ribbons 205 can additionally or alternatively be utilized for non-ribbonized optical fibers 202. Thus, any combination of routing and splicing of ribbon 204, ribbon 205, or fiber 202 to ribbon 204, ribbon 205, or fiber 202 may be utilized in accordance with the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wall cabinet, comprising:
   a mounting panel, the mounting panel comprising a rear panel and a mounting bracket extending from the rear panel along a transverse axis;
   a backboard mountable to the mounting panel such that a gap is defined between the backboard and the rear panel along the transverse axis, the backboard comprising a main body defining a first cable manifold and a second cable manifold each extending along a longitudinal axis from a first inlet to a second inlet and a splice section positioned between the first cable manifold and the second cable manifold along a lateral axis, wherein the first cable manifold and second cable manifold each taper from each respective first inlet and second inlet toward the mounting panel along the transverse axis over a portion of a length thereof; and
   a plurality of splice trays disposed in the splice section.

2. The wall cabinet of claim 1, wherein each of the plurality of splice trays is rotatable about an axis perpendicular to the lateral axis relative to the backboard.

3. The wall cabinet of claim 1, wherein each of the plurality of splice trays is a mass splice fiber management tray.

4. The wall cabinet of claim 1, wherein the plurality of splice trays are stacked along the longitudinal axis.

5. The wall cabinet of claim 1, wherein the main body comprises a first outer sidewall and a first inner sidewall defining the first cable manifold therebetween, and a second outer sidewall and a second inner sidewall defining the second cable manifold therebetween, and wherein the splice section is defined between the first inner sidewall and the second inner sidewall.

6. The wall cabinet of claim 5, wherein the first inner sidewall and second inner sidewall each comprises a plurality of fingers, and wherein the splice section is accessible from the first cable manifold and the second cable manifold through gaps between the fingers.

7. The wall cabinet of claim 1, wherein the backboard further comprises a plurality of tie tabs at an inlet of each of the first cable manifold and second cable manifold.

8. The wall cabinet of claim 1, wherein the mounting panel further comprises a plurality of tie tabs.

9. The wall cabinet of claim 1, further comprising a cover removably mountable to the mounting panel, and wherein the backboard is enclosable between the mounting panel and cover.

10. The wall cabinet of claim 9, further comprising a tray, the tray storable within the cover and removably mountable to the mounting panel.

11. A wall cabinet, comprising:
a mounting panel, the mounting panel comprising a rear panel and a mounting bracket extending from the rear panel along a transverse axis;
a backboard mountable to the mounting panel such that a gap is defined between the backboard and the rear panel along the transverse axis, the backboard comprising a main body, the main body comprising a first outer sidewall, a second outer sidewall, a first inner sidewall, and a second inner sidewall, a first cable manifold defined by and between the first outer sidewall and the first inner sidewall, a second cable manifold defined by and between the second outer sidewall and the second inner sidewall, and a splice section defined by and between the first inner sidewall and the second inner sidewall, wherein the splice section is positioned between the first cable manifold and the second cable manifold along a lateral axis, and wherein the first cable manifold and the second cable manifold each extend along a longitudinal axis; and
a plurality of splice trays disposed in the splice section.

12. The wall cabinet of claim 11, wherein each of the plurality of splice trays is rotatable about an axis perpendicular to the lateral axis relative to the backboard.

13. The wall cabinet of claim 11, wherein each of the plurality of splice trays is a mass splice fiber management tray.

14. The wall cabinet of claim 11, wherein the plurality of splice trays are stacked along the longitudinal axis.

15. The wall cabinet of claim 11, wherein the first inner sidewall and second inner sidewall each comprises a plurality of fingers, and wherein the splice section is accessible from the first cable manifold and the second cable manifold through gaps between the fingers.

16. The wall cabinet of claim 11, wherein the first cable manifold and second cable manifold each taper along a portion of a length thereof.

17. The wall cabinet of claim 11, wherein the backboard further comprises a plurality of tie tabs at an inlet of each of the first cable manifold and second cable manifold.

18. The wall cabinet of claim 11, wherein the mounting panel further comprises a plurality of tie tabs.

19. The wall cabinet of claim 11, further comprising a cover removably mountable to the mounting panel, and wherein the backboard is enclosable between the mounting panel and cover.

20. The wall cabinet of claim 19, further comprising a tray, the tray storable within the cover and removably mountable to the mounting panel.

* * * * *